(12) United States Patent
Noe et al.

(10) Patent No.: US 11,852,589 B2
(45) Date of Patent: Dec. 26, 2023

(54) POLYMER LABEL FOR INSPECTING AND MANAGING PARTS AND DISCRIMINATION METHOD USING THE SAME

(71) Applicants: Yesol Noe, Seoul (KR); Eunsol Noe, Seoul (KR)

(72) Inventors: Yesol Noe, Seoul (KR); Eunsol Noe, Seoul (KR)

(*) Notice: Subject to any disclaimer, the term of this patent is extended or adjusted under 35 U.S.C. 154(b) by 812 days.

(21) Appl. No.: 16/967,823

(22) PCT Filed: Mar. 27, 2019

(86) PCT No.: PCT/KR2019/003566
§ 371 (c)(1),
(2) Date: Aug. 6, 2020

(87) PCT Pub. No.: WO2019/208940
PCT Pub. Date: Oct. 31, 2019

(65) Prior Publication Data
US 2020/0386687 A1     Dec. 10, 2020

(30) Foreign Application Priority Data

Apr. 25, 2018 (KR) .................. 10-2018-0048011
Jun. 1, 2018   (KR) .................. 10-2018-0063678

(51) Int. Cl.
*G01N 21/78*     (2006.01)
*C08K 3/013*     (2018.01)
(Continued)

(52) U.S. Cl.
CPC ............. *G01N 21/78* (2013.01); *C08K 3/013* (2018.01); *C08K 3/34* (2013.01); *C08L 33/02* (2013.01);
(Continued)

(58) Field of Classification Search
CPC ........ G01N 21/78; G01N 21/81; G01N 31/22; C08K 3/013; C08K 3/34; C08L 33/02;
(Continued)

(56) References Cited

U.S. PATENT DOCUMENTS

| | | | | |
|---|---|---|---|---|
| 2012/0059092 A1* | 3/2012 | Lux | .................. | C08L 39/06 524/451 |
| 2014/0224170 A1* | 8/2014 | Noe | .................. | B32B 5/022 116/200 |
| 2014/0295561 A1* | 10/2014 | Winterowd | ............ | G01N 33/46 427/393 |

FOREIGN PATENT DOCUMENTS

JP    2000242175 A  *  9/2000
JP    2017021140 A  *  1/2017

* cited by examiner

*Primary Examiner* — Arlen Soderquist
(74) *Attorney, Agent, or Firm* — KORUS Patent, LLC; Seong Il Jeong

(57) ABSTRACT

The present invention relates to an identification polymer label for inspection and maintenance of parts and an identification method using the same. The present invention provides a durable polymer material label including: a color change layer matrix containing a resin in which a hydrophilic polymer and a hydrophobic polymer are crosslinked; and a pigment layer matrix containing an aqueous pigment in the resin. Due to the stability against discoloration, moisture resistance, and durability of the color change layer matrix and the pigment layer matrix, the polymer label is effective for long-term identification of production information, and waterlogging thereof may be identified. Due to the aqueous fluorescent pigment contained in the pigment layer matrix, even when the identification label is attached to a dark place or and a deep portion or even at night, it may be visually recognized by visual inspection or optical detection.

25 Claims, 3 Drawing Sheets

(51) Int. Cl.
*C08K 3/34* (2006.01)
*C08L 33/02* (2006.01)
*C09J 183/04* (2006.01)
*G09F 3/02* (2006.01)
C09J 7/40 (2018.01)
C09J 7/24 (2018.01)

(52) U.S. Cl.
CPC .............. *C09J 183/04* (2013.01); *G09F 3/02* (2013.01); *C09J 7/24* (2018.01); *C09J 7/401* (2018.01)

(58) Field of Classification Search
CPC ... G09F 3/00; G09F 3/02; C09J 183/04; C09J 7/29
USPC ........................................................ 436/172
See application file for complete search history.

POLYMER LABEL FOR INSPECTING AND MANAGING PARTS AND DISCRIMINATION METHOD USING THE SAME

TECHNICAL FIELD

The present invention relates to an identification polymer label for inspection and maintenance of parts and an identification marking method using the same, and more particularly to an identification polymer label for inspection and maintenance of parts and an identification marking method using the same, in which the identification polymer label is a durable polymer material label including: a color change layer matrix containing a resin in which a hydrophilic polymer and a hydrophobic polymer are crosslinked with each other; and a pigment layer matrix containing an aqueous pigment in the resin, and in which the identification polymer label is effective for long-term identification of product information due to the stability against discoloration, moisture resistance and durability of the color change layer matrix and the pigment layer matrix, waterlogging thereof may be identified, and the polymer label may be visually recognized by visual inspection or optical detection even when the identification polymer label is attached to dark places or deep parts or even at night.

BACKGROUND ART

All products are obligated to be marked with a history of product information. In particular, even in special situations such as waterlogging, waterlogging identification together with product information identification has been consistently required.

Beyond a simple determination of whether or not a mobile phone having an identification label attached thereto is eligible for free repair, stability against discoloration before waterlogging and production information identification after waterlogging should be preserved for a long period of time in the case of various products, including various electrical and electronic devices, automobiles, industrial devices, medical devices and household electronic products, which are used for a long period of time and require inspection and maintenance.

Patent Document 1 discloses a fluid transport substrate comprising a low-molecular-weight hydrophilic polymer resin, in which the substrate is made of cellulose-based papers, for example, paper towels and copy-grade paper, and a material that maintains a cohesive form when wet.

However, the water-ingress label including paper or a soluble polymer is vulnerable to high temperature and high humidity, waterlogging, solvent, friction, and impact, and in particular, lacks durability so that identification that is preserved for a long period of time after waterlogging is impossible. Due to the likelihood of damage caused by the non-durability, it is difficult to identify a product having the label attached thereto.

In addition, the composition has a disadvantage in that rapid water absorption, color development, coloration and discoloration are simultaneously caused by water droplets of condensation that is generated in a high-temperature and high-humidity environment or an environment that changes between high temperature and high humidity. The disadvantage causes unexpected discoloration.

In addition, Patent Document 2 discloses a water-ingress label using a double coating capsule structure. The water-ingress label is intended to prevent unintentional discoloration by the double coated capsule under high-temperature and high-humidity conditions.

However, according to the features of the invention of Patent Document 2, in order to form capsules with different colors (concealment) in water-soluble dyes, the polymers of the capsules and a solvent should not be dissolved and mixed with the dyes so that capsules with different colors are famed. In addition, the polymers of the capsules should have moisture resistance, should be able to be expanded and destroyed by water absorption, and should be dispersible in ink without being dissolved, gelled or swollen. When these conditions are satisfied, concealing capsules having a uniform thickness or a uniform particle size are formed on the amorphous and non-uniform surface of dyes, thereby achieving suitable moisture resistance and color development degree. When these conditions are all satisfied, fabrication may be undertaken so that waterlogging identification is possible. However, such fabrication is difficult to implement in reality, because it is difficult to foam the capsules and to control each of the polymers associated with the capsules.

Patent Document 3 discloses a water-ingress label for an electronic device, which includes a water-ingress check layer that changes color according to environmental changes (e.g., water, moisture, dampness, etc.) inside a check hole formed in an electronic device case. However, the water-ingress label is attached mainly to a mobile phone and used for a simple determination of whether or not the mobile phone is eligible for free repair. In addition, it has not been taught that conventional water-ingress labels can be used for inspection for a long period of time in order to deal with and minimize damage to products having these labels attached thereto.

Accordingly, the present inventors have made efforts to overcome the problems occurring in the conventional art, and as a result, provide an identification polymer label including: an identification mark layer; a color change layer matrix formed under the identification mark layer and containing a resin having both hydrophilicity and hydrophobicity instead of a paper substrate material, the resin being a resin in which a hydrophilic polymer and a hydrophobic polymer are crosslinked with each other; and a pigment layer matrix containing an aqueous pigment in the resin.

The present invention provides an identification polymer label whose long-team durability, durability for stability against discoloration, moisture resistance, water absorption amount, water absorption rate, color development degree and coloring degree of each layer matrix may be easily adjusted by using a composition satisfying the weight ratio between the polymers in the resin. The identification polymer label may be prevented from discoloration even upon waterlogging, and thus waterlogging thereof may be identified. In addition, as the pigment layer matrix contains an aqueous pigment, preferably an adsorbed crosslinked aqueous general pigment or an aqueous fluorescent pigment, the identification polymer label may be accurately recognized by visual inspection or optical detection. Beyond use for a simple determination of whether or not a product having the identification polymer label attached thereto is eligible for free repair, the identification polymer label may minimize damage to the product by inspecting and maintaining the product for a long period of time.

PRIOR ART DOCUMENTS (Patent Document 1) Korean Patent No. 2006-7009345 (entitled "Water Contact Indicator")

(Patent Document 2) Korean Patent No. 2012-0102611 (entitled "Water-Ingress Label Using Double Coating Capsule Structure")

(Patent Document 3) Korean Patent No. 2010-0124189 (entitled "Water-Ingress Label for Electronic Device")

DISCLOSURE

Technical Problem

An object of the present invention is to provide an identification polymer label which may inspect and maintain parts for a long period of time.

Another object of the present invention is to provide an identification polymer label whose waterlogging may be identified and which may be visually recognized by visual inspection or optical detection.

Still another object of the present invention is to provide an identification marking method including exposing the surface of the color change layer matrix depending on the engraving depth in the identification polymer label.

Technical Solution

In order to accomplish the above objects, the present invention provides an identification polymer label (100) for inspection and maintenance of parts, the identification polymer label including:
 a color change layer matrix (20) containing a coloring resin in which a hydrophilic polymer and a hydrophobic polymer are crosslinked with each other at a weight ratio of 6:4 to 2:8; and
 a pigment layer matrix (30) foiled under the color change layer matrix (20) and containing an aqueous pigment and a color-developing resin in which a hydrophilic polymer and a hydrophobic polymer are crosslinked with each other at a weight ratio of 8:2 to 3:7.

The present invention also provides an identification polymer label (200) for inspection and maintenance of parts, the identification polymer label including:
 an identification mark layer (10);
 a color change layer matrix (20) famed under the identification mark layer (10) and containing a coloring resin in which a hydrophilic polymer and a hydrophobic polymer are crosslinked with each other at a weight ratio of 6:4 to 2:8; and
 a pigment layer matrix (30) formed under the color change layer matrix (20) and containing an aqueous pigment and a color-developing resin in which a hydrophilic polymer and a hydrophobic polymer are crosslinked with each other at a weight ratio of 8:2 to 3:7.

In the identification polymer label (100 or 200) for inspection and maintenance of parts according to the present invention, the color change layer matrix is famed of either a single color change layer matrix (20) having a single color or divided color change layer matrices (21 and 22) having different colors. Hereinafter, the single color change layer matrix (20) in the present invention will be referred to as the color change layer matrix (20).

Each resin used in the color change layer matrix (20) and pigment layer matrix (30) of the identification polymer label (100 or 200) for inspection and management of parts according to the present invention is a resin in which a hydrophilic polymer and a hydrophobic polymer are crosslinked with each other. Here, the hydrophilic polymer is a polyoxide-based copolymer including one or more components selected from the group of polyethylene oxide (A), polypropylene oxide (B) and polybutylene oxide (C), and the hydrophobic polymer is one or more selected from the group consisting of polyolefin resin, polyester resin, polyurethane resin, polyamide resin, vinyl resin, fluorine resin, silicone resin, urea resin, phenol resin, epoxy resin and acrylic resin.

In addition, in the identification polymer label (100 or 200) for inspection and management of parts according to the present invention, the color change layer matrix (20) and the pigment layer matrix (30) may further contain one or more adsorbent fillers selected from the group consisting of clay, diatomaceous earth, silica, magnesite and zeolite.

In addition, the color change layer matrix (20) and the pigment layer matrix (30) may further contain water-dispersible polymer fine particles of one or more selected from the group consisting of polyester resin, acrylic resin, polyurethane resin and vinyl resin.

Furthermore, the color change layer matrix (20) and the pigment layer matrix (30) may further contain a coloring and color development enhancer, in which the coloring and color development enhancer may be one or more selected from the group consisting of hydrophilic rubber-based resins, including Arabian rubber and tragacanth rubber, cellulose-based resins, including methyl cellulose, ethyl cellulose, hydroxyethyl cellulose, cyanoethyl cellulose, carboxymethyl cellulose, carboxyethyl cellulose, aminoethyl cellulose and acetylbutyryl cellulose, dextrin, oxidized starch, starch/vinyl acetate graft copolymers, polyvinyl alcohol, polyvinyl pyrrolidone, polyvinyl pyrrolidone/vinyl acetate copolymers, polyethyleneimine resin, polyethylene glycol resin, poly(meth)acrylamide resin, poly(meth)acrylic acid resin, polyamide epoxy resin, poly(meth)acrylic ether resin, polyhydroxy(meth)acrylic resin, polyvinyl acetate resin, polyvinyl acid resin, polyvinylamine resin, and polyoxide resin.

In addition, in the identification polymer label (100 or 200) for inspection and management of parts according to the present invention, the aqueous pigment contained in the pigment layer matrix (30) includes a conventional aqueous general pigment or aqueous fluorescent pigment or includes a pigment in which one or more of the aqueous general pigment or the aqueous fluorescent pigment are adsorbed and crosslinked. As the aqueous pigment contained in the pigment layer matrix (30), the aqueous fluorescent pigment is more preferable for determination of waterlogging.

The identification mark layer (10) in the identification polymer label (200) for inspection and management of parts according to the present invention may contain magnesium silicate hydrate as an engraving enhancer in epoxy-based resin or acryl-based resin.

In the above-described identification polymer label (100 or 200) for inspection and management of parts, an adhesive layer (40) under the pigment layer matrix and a release layer (50) under the adhesive layer may further be formed, and a primer may further be formed between the lower side of the pigment layer matrix (30) and the adhesive layer (40).

In the identification polymer label (100 or 200) for inspection and management of parts according to the present invention, at least one of the color change layer matrix (20), the pigment layer matrix (30) or the identification mark layer (10) may further contain a material that changes from its original color to another color after irradiation with laser light.

The material that changes color may be one or more metal powders selected from among copper, aluminum, nickel, iron or titanium, or may be one or more metal oxides selected from among titanium black ($Ti_4O_7$), aluminum oxide, cuprous oxide, iron oxide or magnesium oxide.

Furthermore, the present invention provides a method for identification marking of a polymer label, the method including exposing the surface of a color change layer matrix in an identification polymer label (100 or 200) for inspection and maintenance of parts by performing one or more selected from surface discoloration by laser light irradiation and engraving depth adjustment, thus making the identification marking possible.

The present invention provides an identification polymer label (100 or 200) for inspection and maintenance of parts, in which the stability against discoloration and durability of the polymer label may be maintained by the color change layer matrix (20), the pigment layer matrix (30) and the identification mark layer (10), which are composed of the above-described compositions, respectively, and the identification polymer label may minimize damage to a product having the polymer label attached thereto by inspecting and maintaining the product for a long period of time.

Moreover, the present invention provides an identification polymer label (110 or 210) for inspection and maintenance of parts, in which the color change layer matrix (20) is composed of divided color change layer matrices (21 and 22) having different colors.

Advantageous Effects

The present invention provides an identification polymer label for inspection and maintenance of parts. Beyond use for a simple determination of whether or not a mobile phone having the identification polymer label attached thereto is eligible for free repair, the identification polymer label can inspect and maintain parts for a long period of time, and thus is useful for various products, including electric and electronic products, automobiles, industrial devices, medical devices, and household electronic products, which need to be inspected and maintained for a long period of time.

In particular, the identification polymer label of the present invention is effective for long-term identification of product information due to the stability against discoloration, moisture resistance and durability of the color change layer matrix, the pigment layer matrix and the identification mark layer, and waterlogging thereof may be identified.

In addition, the identification polymer label for inspection and maintenance of parts according to the present invention may overcome the problem that it is difficult to accurately check discoloration of a product having a conventional water-ingest label attached thereto and inspect the product without dissembling the product, when the conventional water-ingest label is attached to a dark place or a deep portion, or at night, or when the label has a dark color.

MODE FOR INVENTION

Hereinafter, the present invention will be described in detail with reference to the accompanying drawings.

Figure 1:
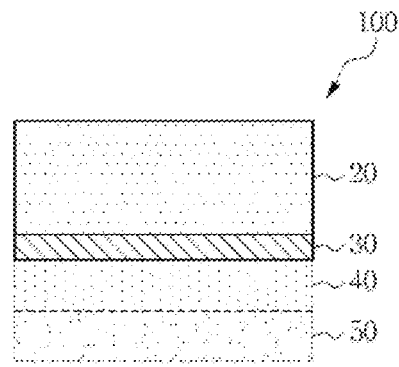
FIG. 1 is a sectional schematic view of an identification polymer label 100 for inspection and maintenance of parts according to a first embodiment of the present invention.

FIG. 1 is a sectional schematic view of an identification polymer label 100 for inspection and maintenance of parts according to a first embodiment of the present invention. Specifically, the present invention provides an identification polymer label 100 for inspection and maintenance of parts, the identification polymer label including:

a color change layer matrix 20 containing a coloring resin in which a hydrophilic polymer and a hydrophobic polymer are crosslinked with each other at a weight ratio of 6:4 to 2:8; and a pigment layer matrix 30 formed under the color change layer matrix 20 and containing an aqueous pigment and a color-developing resin in which a hydrophilic polymer and a hydrophobic polymer are crosslinked with each other at a weight ratio of 8:2 to 3:7.

Figure 2:
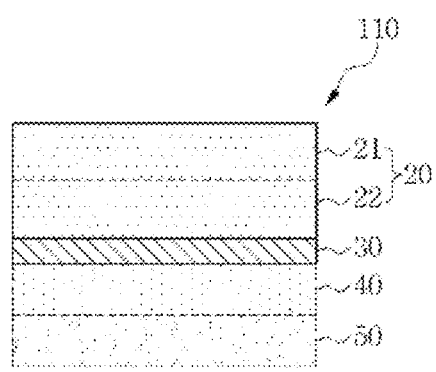
FIG. 2 is a sectional schematic view of an identification polymer label 110 for inspection and maintenance of parts, which includes another embodiment of the color change layer matrix 20 shown in FIG. 1.

FIG. 2 is a sectional schematic view of an identification polymer label 110 for inspection and maintenance of parts, which includes another embodiment of the color change layer matrix 20 shown in FIG. 1. That is, the single layer 20 in FIG. 1 has a single color, whereas the color change layer matrix 20 in FIG. 2 is composed of divided color change layer matrices 21 and 22 having different colors so that users can easily perform visual inspection while visually checking the most preferable engraving depth and adjustment for stability against discoloration.

Figure 3:
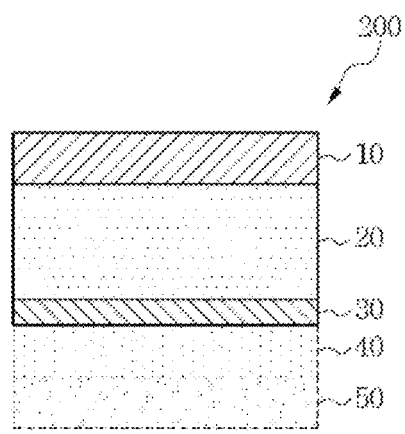
FIG. 3 is a sectional schematic view of an identification polymer label 200 for inspection and maintenance of parts according to a second embodiment of the present invention.

FIG. 3 is a sectional schematic view of an identification polymer label 200 for inspection and maintenance of parts according to a second embodiment of the present invention. An identification mark layer 10 is formed on the color change layer matrix 20 in order to make identification possible and to protect the underlying color change layer matrix 20 and the pigment layer matrix 30 from external solvent, friction, impact, etc.

Specifically, the identification polymer label 200 for inspection and maintenance of parts according to the second embodiment of the present invention includes:

an identification mark layer 10;

a color change layer matrix 20 formed under the identification mark layer 10 and containing a coloring resin in which a hydrophilic polymer and a hydrophobic polymer are crosslinked with each other at a weight ratio of 6:4 to 2:8; and a pigment layer matrix 30 formed under the color change layer matrix 20 and containing an aqueous pigment and a color-developing resin in which a hydrophilic polymer and a hydrophobic polymer are crosslinked with each other at a weight ratio of 8:2 to 3:7.

Figure 4:
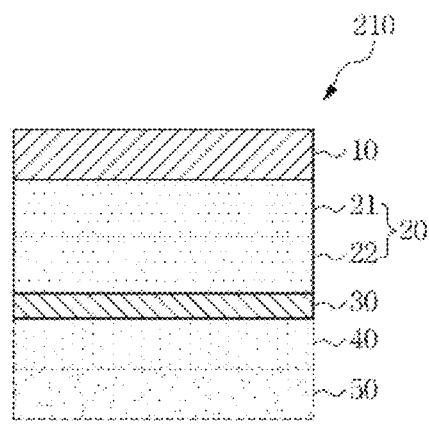
FIG. 4 is a sectional schematic view of an identification polymer label 210 for inspection and maintenance of parts, which includes another embodiment of the color change layer matrix 20 shown in FIG. 3.

FIG. 4 is a sectional schematic view of an identification polymer label 210 for inspection and maintenance of parts, which includes another embodiment of the color change layer matrix 20 shown in FIG. 3. That is, the single layer 20 in FIG. 3 has a single color, whereas the color change layer matrix 20 in FIG. 4 is composed of divided color change layer matrices 21 and 22, like the case of FIG. 2.

The identification polymer labels 100, 110, 200 and 210 for inspection and maintenance of parts according to the first and second embodiments of the present invention may further include an adhesive layer 40 formed under the pigment layer matrix 30, and a release layer 50 formed under the adhesive layer. The adhesive layer 40 and the release layer 50 may be famed of known materials (e.g., a pressure-sensitive adhesive, a hot-melt adhesive or a heat-activatable adhesive and a release-coated film or paper, etc.) employed for the purposes of adhesion and release, respectively.

In addition, the identification polymer labels 100, 110, 200 and 210 for inspection and maintenance of parts according to the first and second embodiments of the present invention may further include a primer layer foamed between the powder side of the pigment layer matrix 30 and the adhesive layer 40, in which the primer layer may be famed of a coating material, such as acrylic resin or polyurethane resin, for the purpose of protecting the pigment layer matrix 30, or may be famed of a film, such as PET, PE or PI, in order to foam a coating layer on the pigment layer matrix 30 and the adhesive layer 40.

Hereinafter, the features of the major layers of the present invention will be described in detail.

1. Color Change Layer Matrix 20

In the identification polymer labels 100 and 200 for inspection and maintenance of parts according to the first and second embodiments of the present invention, the color change layer matrix 20 is a coating layer which is blocked from moisture but is colored by water absorption upon waterlogging. The color change layer matrix 20 is required to have moisture resistance and long-team durability while having limited water swellability.

To satisfy these physical properties, the color change layer matrix 20 of the present invention may contain a coloring resin in which a hydrophilic polymer and a hydrophobic polymer are crosslinked with each other at a weight ratio of 6:4 to 2:8.

The hydrophilic polymer is a polyoxide-based copolymer including one or more components selected from the group of polyethylene oxide (A), polypropylene oxide (B) and polybutylene oxide (C), and may be a di-, tri- or tetra-block copolymer.

The polyethylene oxide (A) is water-soluble and, at the same time, have excellent tensile strength, chemical resistance, flexibility, and moisture resistance, and the polypropylene oxide (B) and the polybutylene oxide (C) may have high hydrophobicity and increased physical strength due to increased carbon bonds compared to the polyethylene oxide (A). Accordingly, the color change layer matrix may be modified to have water swellability by combining these components so as to have a composition and composition ratio determined in consideration of the physical properties of each component according to desired physical properties.

Preferably, in an embodiment of the present invention, the coloring resin that is used in the color change layer matrix 20 may be an A-B-A triblock copolymer, more preferably a B-A-B triblock copolymer, but is not limited to the triblock copolymer.

In addition, the coloring resin that is used in the color change layer matrix 20 is preferably a modified polyoxide copolymer obtained by crosslinking the hydrophilic polymer with a hydrophobic polymer to enhance physical strength. In an embodiment of the present invention, a commercially available product (trade name: SCH1705PO (Orbital) is used as the modified polyoxide copolymer, but is not limited thereto.

The hydrophobic polymer may be at least any one selected from the group consisting of polyolefin resin, polyester resin, polyurethane resin, polyamide resin, polyvinyl resin, fluorine resin, silicone resin, urea resin, phenol resin, epoxy resin and acrylic resin, but is not particularly limited to these resins.

When the hydrophobic polymer is contained, it is possible to enhance moisture resistance and durability, adjust the coloring of the coloring resin by controlling water absorption, swellability and dispersibility to suitable levels, and also prevent damage and the like by increasing the bonding of the coloring resin.

The weight ratio between the hydrophilic polymer and the hydrophobic polymer in the coloring resin that is used in the color change layer matrix 20 may be optimized to satisfy the physical properties of the coloring resin, such as water solubility, water swellability and water dispersibility. Preferably, the hydrophilic polymer and the hydrophobic polymer may be crosslinked with each other at a weight ratio of 6:4 to 2:8, more preferably 5:5 to 3:7.

The coloring resin obtained by crosslinking at the above-described weight ratio, which is used in the color change layer matrix, preferably has a limited water swellability of 1% to 30%, more preferably 10% to 20%. In this case, the coloring resin may be swollen by moisture absorption when exposed to a large amount of moisture or a high-temperature and high-humidity environment, and when the swelling reaches a saturated state, the swelling is stopped and further moisture absorption may be blocked. On the other hand, when the coloring resin is waterlogged, it may be swollen by absorbing a large amount of water, and when the swelling reaches a saturated state, further swelling is stopped, but the swollen polymer may be penetrated with water while it is dispersed, whereby coloring according to the present invention may be stably achieved.

In addition, the color change layer matrix 20 may further contain a hydrophilic polymer as a coloring enhancer to enhance the physical properties of the coloring resin that is used therein.

A preferred example of the polymer as the coloring enhancer may be at least one hydrophilic polymer selected from among hydrophilic rubber-based resins, including Arabian rubber and tragacanth rubber, cellulose-based resins, including methyl cellulose, ethyl cellulose, hydroxyethyl cellulose, cyanoethyl cellulose, carboxymethyl cellulose, carboxyethyl cellulose, aminoethyl cellulose and acetylbutyryl cellulose, dextrin, oxidized starch, starch/vinyl acetate graft copolymers, polyvinyl alcohol, polyvinyl pyrrolidone, polyvinyl pyrrolidone/vinyl acetate copolymers, polyethyleneimine resin, polyethylene glycol resin, poly(meth)acrylamide resin, poly(meth)acrylic acid resin, polyamide epoxy resin, poly(meth)acrylic ether resin, polyhydroxy(meth)acrylic resin, polyvinyl acetate resin, polyvinyl acid resin, polyvinylamine resin, and polyoxide resin; or a hybrid polymer including, in addition to the hydrophilic polymer, at least one of polyolefin resin, polyester resin, polysulfone resin, polyurethane resin, vinyl resin, fluorine resin, silicone resin, urea resin, phenol resin, epoxy resin and acrylic resin; or a hybrid copolymer including, in addition to the hybrid polymer, at least one of the hydrophilic polymer and the hydrophobic polymer.

In the identification polymer labels 100 and 200 for inspection and maintenance of parts according to the first and second embodiments of the present invention, the color change layer matrix 20 is composed of a crosslinked composition containing the coloring resin and one or more of water-dispersible copolymer fine particles, an adsorbent filler for a color change layer matrix, and a pigment. The color change layer matrix 20 is formed by coating the composition to a suitable thickness, and the matrix is preferably famed to have a thickness of 20 μm to 60 μm.

The color change layer matrix 20 of the present invention may be colored by penetration of the aqueous pigment due to surface activity that is produced even inside the matrix by adjustment of the physical properties, including water solubility, water swellability and water dispersibility. In addition, due to the composition, the water absorption amount and water absorption rate of the color change layer matrix as well as the moisture resistance thereof may be easily and stably controlled and adjusted, and discoloration thereof may also be prevented.

The water-dispersible copolymer fine particles that are contained in the color change layer matrix may preferably be at least one selected from the group consisting of polyester resin, acrylic resin, polyurethane resin, and vinyl resin. Examples of the water-dispersible copolymer fine particles include polyvinyl ether, polyvinyl acetate, polystyrene, ethylene/vinyl acetate copolymers, (meth)acrylic ester resin polymers, styrene/butadiene copolymers, and silicone/acrylic resin copolymers.

When the water-dispersible copolymer fine particles are contained, the water swellability of the color change layer matrix may be suppressed, but the water dispersibility thereof may be increased, and thus the amount of water absorption and the rate of water absorption may be suitably adjusted. The particle size of the fine particles is preferably 0.1 μm to 5 μm.

In addition, the adsorbent filler for a color change layer matrix is mainly composed of a porous, adsorbent, coloring, swellable or dispersible material, and is not particularly limited as long as it has these properties. Examples of the adsorbent filler include oxide, hydroxide, sulfide, chromate, silicate, sulfate, carbonate, carbon, and magnesium silicate hydrate. Preferred examples of the adsorbent filler include clay, diatomaceous earth, silica, magnesite and zeolite. The adsorbent filler particularly has coloring and dispersibility properties, and thus is preferable for the physical properties of the color change layer matrix 20. In addition, the moisture resistance, water absorption amount and water absorption rate of the color change layer matrix may be controlled and adjusted by increasing or decreasing the content of the adsorbent filler.

The content of the adsorbent filler is preferably 20 to 250 parts by weight, more preferably 50 to 150 parts by weight, most preferably 70 to 100 parts by weight, based on 100 parts by weight of the coloring resin. If the content of the adsorbent filler is less than 20 parts by weight, the water absorption, swellability, dispersibility, coloring ability and pigment retainability of the coloring resin may be lowered, and if the content of the adsorbent filler is more than 250 parts by weight, interlayer adhesion may be lowered.

The particle size of the adsorbent filler is preferably 0.1 μm to 5 μm.

In addition, the pigment includes an inorganic pigment and an organic pigment. The inorganic pigment serves mainly to impart color and control moisture, and the content thereof is preferably 10 to 50 parts by weight, more preferably 25 to 40 parts by weight, based on 100 parts by weight of the coloring resin. The organic pigment serves mainly to increase clearness, because, when the selected inorganic pigment is used, clearness is low, and when the content of the inorganic pigment is increased, the water absorption of the color change layer matrix is disadvantageously lowered. The organic pigment may include a dye, and the content thereof depends on color and is preferably 1 to 10 parts by weight based on 100 parts by weight of the coloring resin. The particle size of the pigment is preferably 0.1 μm to 3 μm.

Examples of the inorganic pigments include metal oxide, hydroxide, sulfide, chromate, silicate, sulfate, ferrocyanide, phosphate, metal powder, and carbon. Specific examples thereof include titanium dioxide, barium sulfate, lithopone, zinc oxide, black iron oxide, red iron oxide, cobalt blue, zinc sulfide, ultramarine, chrome yellow, emerald green, cobalt violet, deep blue, silver or gold metallic, carbon black, and titanium black. Examples of the organic pigments include azo-based, azine-based, phthalocyanine-based, quinophthalone-based, and metal complex-based pigments. The type of pigment that may be used is not particularly limited.

As the organic pigment, those available under the trade names MEGHAFAST BLUE BD 909 KN P (Meghmani), PV Fast Yellow HG, PV Fast Red B (Clariant) and Aniline Black (Orient Chemical) may be used.

The crosslinking agent in the composition serves mainly as an agent for adjusting the swellability, dispersibility and durability of the coloring resin, and preferably includes polyisocyanate-based resin, melamine-based resin, urea-based resin, amine-based resin, azidirine-based resin, or polyamide-based resin, but is not particularly limited thereto. The crosslinking agent may preferably be polyisocyanate-based resin. The content of the crosslinking agent is 10 to 200 parts by weight, more preferably 15 to 130 parts by weight, most preferably 20 to 50 parts by weight, based on 100 parts by weight of the coloring resin. If the content of the crosslinking agent is less than 10 parts by weight, durability may be lowered, and if the content of crosslinking agent is more than 250 parts by weight, moisture resistance and durability may increase, but water absorption ability and coloring ability may be lowered.

The identification polymer labels 110 and 210 for inspection and maintenance of parts according to the first and second embodiments of the present invention are other embodiments as shown in FIGS. 2 and 4. In these identification polymer labels, divided color change layer matrices 21 and 22 having different colors may be obtained by modifying the composition of the single color change layer matrix 20 to have two different colors, and may be composed of the divided upper color change layer matrix 21 and the divided lower color change layer matrix 22. In some cases, the composition of the divided upper matrix 21 may also be used to enhance durability by increasing the content of the hydrophobic polymer or the crosslinking agent therein.

According to the present invention as described above, the stability against discoloration of the color change layer matrix 20, 21 or 22 as well as the moisture resistance and durability thereof may be maintained by adjustment of the moisture resistance, water absorption amount and water absorption rate of the matrix and the durability thereof. In particular, identification that is preserved for a long period of time by the durability is possible.

2. Pigment Layer Matrix 30

In the identification polymer labels 100, 110, 200 and 210 for inspection and maintenance of parts according to the first and second embodiments of the present invention, the pigment layer matrix 30 that is formed under the above-described color change layer matrix 20 has physical properties, including water solubility, water swellability and water dispersibility, and particularly contains a color-developing resin having a limited water swellability of 5% to 50% and an aqueous pigment. The pigment layer latex 30 may be formed of a coating layer, which is blocked from moisture, but absorbs water upon waterlogging such that the contained aqueous pigment develops color. The water swellability is more preferably limited to the range of 20% to 30% in view of durability.

The color-developing resin in the pigment layer matrix 30 is the same as the type of coloring resin contained in the above-described color change layer matrix 20, and is used after optimization of the physical properties thereof, including color development, moisture resistance and durability properties.

Specifically, the color-developing resin in the pigment layer matrix 30 of the present invention is a resin in which a hydrophilic polyoxide-based block copolymer including a polypropylene oxide block and a polyethylene oxide block, which has better physical strength, is crosslinked with a hydrophobic polymer in order to adjust the physical properties, including water solubility, water swellability and water dispersibility. The hydrophilic polyoxide-based block copolymer that is used in the pigment layer matrix 30 may be the same as the hydrophilic polyoxide-based copolymer used in the color change layer matrix 20.

According to the present invention, to satisfy the above-described physical properties, the color-developing resin in the pigment layer matrix 30 may preferably be a modified polyoxide copolymer obtained by crosslinking the hydrophilic polymer and the hydrophobic polymer with each other at a weight ratio of 8:2 to 3:7. The weight ratio is more preferable for the physical properties. The pigment layer matrix 30 is designed such that it can stably develop color upon waterlogging and can stably provide the color to the color change layer matrix 20 thereon.

In an embodiment of the present invention, a commercially available product (trade name: SCH2000PO (Orbital)) is used as the modified polyoxide copolymer, but is not limited thereto.

Depending on the weight ratio between the hydrophilic polymer and the hydrophobic polymer according to the present invention, moisture resistance, water absorption amount, water absorption rate, color development ability, coloring ability, and durability are easily adjusted, and the color developing resin in the pigment layer matrix 30 performs its function.

Specifically, the hydrophobic polymer may be the same as the type of hydrophobic polymer contained in the above-described color change layer matrix 20. When the hydrophobic polymer is contained, it is possible to control the color development degree by controlling water absorption degree, swellability and dispersibility to suitable levels, and it is also possible to prevent damage and the like by increasing the bonding of the color developing resin and enhancing the durability thereof.

In addition, the pigment layer matrix 30 may further contain a hydrophilic polymer as a color development enhancer to enhance the physical properties of the color developing resin that is used therein.

A preferred example of the hydrophilic polymer as the color development enhancer may be one or more selected from the group consisting of hydrophilic rubber-based resins, hydrophilic Arabian rubber and tragacanth rubber, cellulose-based resins, including methyl cellulose, ethyl cellulose, hydroxyethyl cellulose, cyanoethyl cellulose, carboxymethyl cellulose, carboxyethyl cellulose, aminoethyl cellulose and acetylbutyryl cellulose, dextrin, oxidized starch, starch/vinyl acetate graft copolymers, polyvinyl alcohol, polyvinyl pyrrolidone, polyvinyl pyrrolidone/vinyl acetate copolymers, polyethyleneimine resin, polyethylene glycol resin, poly(meth)acrylamide resin, poly(meth)acrylic acid resin, polyamide epoxy resin, poly(meth)acrylic ether resin, polyhydroxy(meth)acrylic resin, polyvinyl acetate resin, polyvinyl acid resin, polyvinylamine resin, and polyoxide resin.

In the identification polymer labels 100, 110, 200 and 210 for inspection and maintenance of parts according to the first and second embodiments of the present invention, the pigment layer matrix 30 contains an aqueous pigment, and it is possible to use all pigments that can develop color and color the color change layer matrix upon waterlogging. As examples of the aqueous pigment, physical colorants include aqueous general pigments and aqueous fluorescent pigments, and examples of the pigment include aqueous dyes, water-soluble dyes, and the like. Chemical (reaction) colorants include colorants with mordants, and colorants with pH levels, and examples of the colorant include natural pigments, iron hydroxide, and hematoxylin. The type and color of the aqueous pigment are not particularly limited, and a mixture of one or more of the above-described aqueous pigments may be used. The aqueous pigment may be in the form of solution, slurry or powder, and the content of the aqueous pigment is preferably 0.1 to 30 parts by weight based on 100 parts by weight of the color developing resin.

As the aqueous pigment that is contained in the pigment layer matrix 30, it is more preferable to use a pigment in which one or more of the aqueous general pigment and the aqueous fluorescent pigment are adsorbed and crosslinked (hereinafter referred to as the "adsorbed crosslinked pigment").

The adsorbed crosslinked pigment is a pigment obtained by addition, incorporation, adsorption and crosslinking of the aqueous pigment to porous adsorbent filler fine particles having small pores corresponding to the molecular size of the aqueous pigment, and it makes detachment of the pigment difficult and is preferable for controlling the moisture resistance and discoloration rate of the pigment layer matrix 30. As the crosslinking agent, a silane coupling agent, an acryl-based or epoxy-based compound or an organic peroxide may be used. The type of adsorbent filler, the type of crosslinking agent and the method for adsorption and crosslinking are not particularly limited.

In addition, the aqueous fluorescent pigment that is used as the aqueous pigment contained in the pigment layer matrix 30 is special and preferable for determination of waterlogging.

When the aqueous fluorescent pigment is used, it has advantages in that the aqueous fluorescent pigment colors the color change layer matrix 20 upon waterlogging and the colored aqueous fluorescent is clearly visually recognized by visual inspection or optical detection (due to excitation by visible light, particularly ultraviolet light or infrared light). In addition, the aqueous fluorescent pigment has features of higher brightness, saturation, clearness and luminance than the general pigment, and thus will be more useful for visual inspection.

Therefore, as the pigment layer matrix 30 of the present invention contains the aqueous fluorescent pigment having the above-described features, even when the identification label is attached to a dark place or a deep part or even at night, it is possible to accurately check discoloration or inspect without disassembling the part having the identification polymer label attached thereto, and users may also utilize the security function due to the fluorescent characteristics.

As the aqueous fluorescent pigment, it is possible to use an aqueous color fluorescent pigment suitable for visual inspection and optical detection or an aqueous white (colorless) fluorescent pigment suitable for optical detection. As the aqueous white fluorescent pigment, a water-soluble inorganic fluorescent pigment (e.g., barium sulfide or magnesium tungstate) is also preferable, which is advantageous for optical detection due to durability, phosphorescence (afterglow), and clearness characteristics.

As the aqueous general pigment among the aqueous pigments, a commercially available product (e.g., trade name Sirius Blue GN, or Red F4BL (DyStar) may be used, and as the aqueous fluorescent pigment, a commercially available product (e.g., trade name Luminous Yellow FL, Rhodamine M-BN, or White C-BYB 03 (DyStar) may be used.

In addition, as the adsorbed crosslinked pigment, it is possible to use a commercially available general pigment (e.g., TexF red 30, or TexF blue 65 (Smartcolor) and a commercially available fluorescent pigment (e.g., FUV-03 Red, FUV-03 Blue, or FUV-03 White (Smartcolor).

The adsorbent filler fine particles that are used to adsorb and crosslink the aqueous pigment are adsorbent filler particles for color development, and are contained in the pigment layer matrix 30 of the present invention and also function as an agent for adjusting color development, and the particle size thereof is preferably 0.1 µm to 10 µm.

The pigment layer matrix 30 of the present invention is composed of a crosslinked composition containing the color developing resin, the aqueous pigment and the adsorbent filler for color development. The pigment layer matrix 30 may be famed by coating the composition to a suitable thickness, and the matrix is preferably famed to have a thickness of 3 µm to 20 µm.

The adsorbent filler for color development is the same as the type of adsorbent filler contained in the above-described color change layer matrix 20, but is used after optimization of the color development property thereof. As a preferred example, clay, diatomaceous earth, silica, magnesite or zeolite may be used. The content of the adsorbent filler may be 20 to 150 parts by weight, more preferably 40 to 70 parts by weight, based on 100 parts by weight of the color developing resin. If the content of the adsorbent filler is less than 20 parts by weight, the adsorption of the aqueous pigment may be lowered, and if the content of the adsorbent filler is more than 150 parts by weight, the degree of color development may be lowered.

In addition, the pigment layer matrix 30 may further contain water-dispersible polymer fine particles and a pigment. The water-dispersible polymer fine particles and the pigment are the same as the types of those contained in the above-described color change layer matrix 20, but are used are used after optimization of the physical properties thereof, such as color development, moisture resistance and durability properties.

The crosslinking in the composition is the same as the type of crosslinking contained in the above-described color change layer matrix 20. As the crosslinking agent, polyisocyanate-based resin may preferably be used. The content of the crosslinking agent is preferably 10 to 50 parts by weight, more preferably 15 to 30 parts by weight, based on 100 parts by weight of the color developing resin. If the content of the crosslinking agent is less than 10 parts by weight, the degree of color development may be satisfied, but durability may be lowered, and if the content of the crosslinking agent is more than 50 parts by weight, durability may be satisfied but the degree of color development may be lowered.

When the moisture resistance, water absorption amount and water absorption rate of the color change layer matrix 20, 21 or 22 and the color development rate of the pigment layer matrix 30 are adjusted as described above, water absorption upon waterlogging, color development and coloring may be sequentially performed. By this performance, the stability against discoloration may be dramatically increased, and unexpected discoloration due to the simultaneous occurrence of water absorption, color development and coloring in a moment can never occur. In addition, long-team durability is maintained by the matrices.

Furthermore, the adsorbed crosslinked pigment of the pigment layer matrix 30 continuously develops color upon long-term waterlogging, and provides the color to and colors the color change layer matrix 20 thereon.

Meanwhile, the pigment layer matrix 30 may also be formed by whole surface coating or by partial coating (e.g., dot or pattern coating) having no limitation in foam in order to adjust the color development degree or durability.

3. Identification Mark Layer 10

In the identification polymer labels 200 and 210 for inspection and maintenance of parts according to the present invention, the identification mark layer 10 is formed on the above-described color change layer matrix 20, can identify product information, and protects the underlying color change layer matrix 20 and the pigment layer matrix 30 from an external solvent, friction, impact, and the like.

With the recent miniaturization of adherends, fine letters texts and the like, which have a size small so that they are difficult to read with the naked eye, are importantly marked on general labels, but conventional ink printing methods have limitations. Accordingly, the present invention is intended to provide the identification polymer labels 200 and 210 of the present invention, on which users can implement fine identification marking and modification by computer-assisted laser engraving which is an easy method.

The identification mark layer 10 is a coating layer containing an engravable and durable polymer. The polymer that is used may preferably be selected from among a hybrid polymer including at least one of acrylic, polyether, (unsaturated) polyester, polyurethane, polystyrene, acrylonitrile butadiene styrene, polyethylene, polypropylene, polyacetal, polybutadiene, polymethylpentene, polymethyl methacrylate, polycarbonate, polysulfone, polyacetal, silicon-based, elastomer-based, ethylene vinyl acetate copolymer, polyvinyl butyral, polyethylene terephthalate, polyethylene naphthalate, polybutylene terephthalate, polyamide, polyacrylamide, polynorbornene-based, polyphenylene oxide, modified polyphenylether, polyphenylene sulfide, modified polyoxide, cellulose, polyvinyl alcohol, polyvinyl pyrrolidone, fluorine, urea, phenol and epoxy resins, and a copolymer including the hybrid polymer.

More preferably, epoxy resin and acrylic resin are preferable in terms of engraving efficiency and productivity, but have the disadvantage of brittleness. However, these resins have advantages in that the excessive energy use of laser light for compensating for engravability that is decreased by high elongation (e.g., urethane resin) is prevented, and in that yellowing decreases.

Accordingly, as the resin of the identification mark layer 10 of the present invention, epoxy resin having better durability than acrylic resin may be used. Preferably, an epoxy resin having a molecular weight of 200 to 100,000 may be used. More preferably, an epoxy resin having a molecular weight of 300 to 60,000 may be used in order to overcome the disadvantage of brittleness. If the molecular weight of the epoxy resin is less than 200, the engravability thereof may decrease due to the high density thereof, and if the molecular weight of the epoxy resin is more than 60,000, the epoxy resin may have excellent engravability, but shows a behavior in which the resin is broken finely upon engraving.

According to the present invention, in order to overcome the above-described disadvantages and enhance flexibility while maintaining engravability and durability, the epoxy resin may be used as a mixture with polyol resin or polyester resin. More preferably, the epoxy resin may be used as a mixture with polyol resin. Specifically, an epoxy-modified polyol may most preferably be used, which is an epoxy-based resin obtained by mixing 90 wt % to 98 wt % of the epoxy resin with 2 wt % to 10 wt % of polyol resin. The present invention is implemented using a commercially available epoxy-modified polyol (trade name: CTC100-S (Orbital)), but is not limited thereto.

To enhance the engravability, the present inventors have conducted an experiment with reference to engravability that is being applied to a vehicular gear shift handle, and as a result, have found that, when magnesium silicate hydrate ($Mg_3Si_4O_{10}(OH)_2$) that has been used mainly as a durability enhancer in a conventional art is added, the ability to engrave fine and thin lines having a width of 100 μm or less is specifically excellent. The experiment on enhancement of engravability was performed for fine lines of 80 μm using the model and conditions described in Experimental Example 1 of the present invention.

As a result, the content of the magnesium silicate hydrate is preferably 2 to 40 parts by weight, more preferably 3 to 20 parts by weight, most preferably 4 to 10 parts by weight, based on 100 parts by weight of the epoxy-based resin. If the content of the magnesium silicate hydrate is less than 2 parts by weight, the ability to engrave fine lines may be excellent, but the edges of the lines may be fine, but may be poor due to breakage, and if the content of the magnesium silicate hydrate is more than 40 parts by weight, the edges of lines may be good, but the engravability may be degraded due to the excessive content, and thus the identification property may become poor.

Based on the above-described results, the present inventors believe that the soft and plate-like properties of the magnesium silicate hydrate physically bind the polymer, thereby preventing defects at the edges of lines from occurring due to breakage or peeling off.

The identification mark layer 10 of the present invention is composed of a crosslinked composition containing 100 parts by weight of the epoxy-based resin, 2 to 40 parts by weight of the magnesium silicate hydrate, 5 to 60 parts by weight of the pigment and 30 to 170 parts by weight of the crosslinking agent. The composition may be formed into a coating layer having a suitable thickness.

The pigment serves as a color imparting agent, and is the same as the type of pigment contained in the above-described color change layer matrix 20, but should have a color different from that in the color change layer matrix 20 in order to facilitate discrimination. The content of the pigment may vary depending on the color to be displayed, and the particle size of the pigment is preferably 0.1 μm to 5 μm.

In addition, the identification mark layer 10 may further contain a filler as an agent for enhancing durability and weather resistance. The content of the filler is preferably 20 to 60 parts by weight based on 100 parts by weight of the epoxy-based resin. The filler that is used may be selected from the types of coloring fillers contained in the above-described color change layer matrix 20, and may preferably be alumina or calcium carbonate.

The crosslinking agent serves to enhance durability, and is the same as the type of crosslinking agent contained in the color change layer matrix 20. The crosslinking agent is preferably polyisocyanate-based resin, and the content of the crosslinking agent may preferably be 30 to 170 parts by weight, more preferably 50 to 100 parts by weight, based on 100 parts by weight of the epoxy-based resin.

The thickness of the identification mark layer 10 is preferably 10 μm to 15 μm. The identification mark layer 10 of the present invention may be easily engraved with a fine and sophisticated mark using a laser marking device, due to the characteristics of magnesium silicate hydrate used as the engraving enhancer which is suitably contained in the epoxy-based resin modified to have excellent engravability, durability and flexibility.

Meanwhile, the characteristics of the magnesium silicate hydrate may also preferably be used in the above-described color change layer matrix 20, and are effective for the identification marking and method described below. The content of the magnesium silicate hydrate is preferably 2 to 10 parts by weight based on 100 parts by weight of the color change layer matrix 20.

Furthermore, the present invention provides a method for identification of a polymer label, the method including exposing the surface of the color change layer matrix 20, 21 or 22 by adjusting the engraving depth in the polymer label 100, 110, 200 or 210 for inspection and maintenance of parts, thus making identification of waterlogging possible.

Specifically, in explanation of the method for identification of a polymer label according to the present invention, users who use the identification polymer label 100, 110, 200 or 210 for inspection and maintenance of parts may form an identification mark by laser engraving the top of the label.

More specifically, referring to FIGS. 1 and 3, in the case of the identification polymer labels 100 and 200 for inspection and maintenance of parts according to the present invention, users may engrave the polymer label by adjusting the engraving depth to a suitable portion of the single color change layer matrix 20.

In addition, referring to FIGS. 2 and 4, in the case of the identification polymer labels 110 and 210 for inspection and maintenance of parts according to the present invention, users may engrave the polymer label by adjusting the engraving depth to a suitable portion of the divided color change layer matrices 21 and 22 having different colors.

Figure 5:
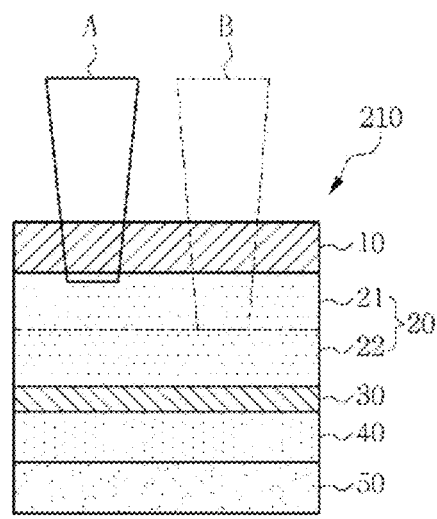
FIG. 5 illustrates an identification marking method depending on the engraving position in the identification polymer label 210 for inspection and maintenance of parts according to the present invention.

More specifically, as shown in FIG. 5, the identification polymer label is configured such that users may easily perform engraving while visually checking the engraving depth up to the boundary line B between the divided color change layer matrixes 21 and 22.

The boundary line B is famed to have an optimum thickness in consideration of the moisture resistance, water absorption amount and water absorption rate of the divided lower matrix 22 among the divided color change layer matrices 21 and 22 and the color development rate of the pigment layer matrix 30, and is most preferable for the stability against discoloration according to the present invention, and thus the most ideal discoloration will develop.

Alternatively, when a position which is slightly (e.g., ±1 μm to 5 μm with respect to the boundary line B) above the boundary line in FIG. 5 is engraved, delayed discoloration may develop, and when a position below the boundary line is engraved, rapid discoloration may develop.

Referring to FIG. 5, when the top A of the divided upper color change layer matrix 21 is engraved, the underlying color change layer matrix 30 may be prevented from water penetration and discoloration even under waterlogging conditions, due to the optimization and large thickness of the above-described color change layer matrices 21 and 22, and product information marked on the surface of the color change layer matrix A may be clearly identified.

Meanwhile, the single color change layer matrix 20 may be advantageous in economic terms and for a skilled person, and the divided color change layer matrices 21 and 22 may be advantageous for an unskilled person or very sophisticated work. In addition, the color change layer matrix 20 displayed on the upper portion may be engraved with a vivid color or a blackened color by controlling laser power or frequency by users.

Figure 6:
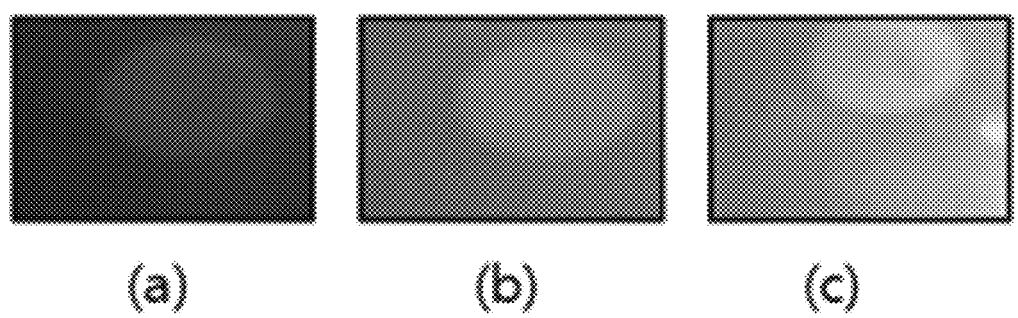
FIG. 6 shows the results of observing the color change under waterlogging conditions after separate preparation of a pigment layer matrix 30 for the identification polymer label of the present invention.

As the results of checking the color change between before and after waterlogging, FIG. 6 shows the results of observing the color change caused by color development due to water droplets, after preparing the pigment layer matrix 30 alone using the adsorbed crosslinked pigment according to Preparation Example 4. It can be seen that, under the above conditions, (a) a very small amount of color development occurs after 10 seconds, (b) a small amount of color development occurs even after 2 minutes, and (c) the color gradually fades after 5 minutes and continues to develop.

Meanwhile, the pigment layer matrix 30 with an unadsorbed crosslinked pigment was prepared by increasing the crosslinking degree according to Preparation Example 3, and then the color change due to color development under the same conditions as described above were observed. As a result, results similar to those of Preparation Example 4 appeared (not shown), but the pigment layer matrix of Preparation Example 4, prepared using the adsorbed crosslinked pigment, showed better stability.

Moreover, the present invention provides an identification marking method which is most preferably for stability against discoloration, the method including exposing the surface of the color change layer matrix 20, 21 or 22 in the identification polymer label 100, 110, 200 or 210 by performing one or more selected from surface discoloration and engraving depth adjustment, thus making identification marking possible.

Therefore, according to the present invention, at least any one of the identification mark layer 10, the color change layer matrix 20, 21 or 22 or the pigment layer 30 may further contain a material that changes from its original change to another color after irradiation with laser light.

In the present invention, reaction method (e.g., foaming, condensation, carbonization, or oxidation), color (e.g., from colored to colorless, or from colorless to colored), or shape (e.g., liquid, powder, capsule) is not particularly limited as long as a material having the above-described property is used. However, it is preferable to use a black material that changes color to white by oxidation or foaming reaction, or a white or light-colored material that change color to black by carbonization reaction, because this material provides the maximum color contrast and is preferable for realization of clearness.

Particularly preferably, examples of the material that changes color include metal powders, including aluminum, nickel, iron and titanium, or metal oxides, including titanium black ($Ti_4O_7$), aluminum oxide, cuprous oxide, iron oxide and magnesium oxide. These materials may mostly also serve as the pigment or filler of the present invention, shows excellent clearance after oxidation or carbonization reaction, have little change over time, and also exhibits excellent engravability.

Due to these characteristics, users may easily perform identification marking, which is most preferable for the stability against discoloration, while visually checking the color that is changed or a suitable engraving depth, by controlling laser light power, frequency or the like.

Examples of commercially available products of the material include trade name Tilack D Ako Kasei (oxidation), Stapa 88 nl Eckart (carbonization), or Lazerflair series Merck (oxidation or carbonization).

In the present invention, the content of the material that changes color is preferably 0.1 to 10 parts by weight based on 100 parts by weight of the resin of the identification mark layer 10, the color change layer matrix 20, 21 or 22 or the pigment layer matrix 30, and the particle size of the material is preferably 0.1 μm to 5 μm.

In the above-described example, when the white upper matrix 21 in the polymer label 110 of Example 2 contains the material that changes from a light color to black, production information may be marked on the surface of the white upper matrix 21, and a mark for identification of waterlogging may be formed by engraving. Accordingly, in spite of a large amount of product information, damage to the lower matrix 22, which may also be caused when relying only on engraving, can be prevented.

In addition, when the material is also contained in the pigment layer matrix 30, it will be very effective for preventing the excessive depth of the lower matrix 22 from being engraved or for detecting the excessively engraved defective product.

Figure 7:
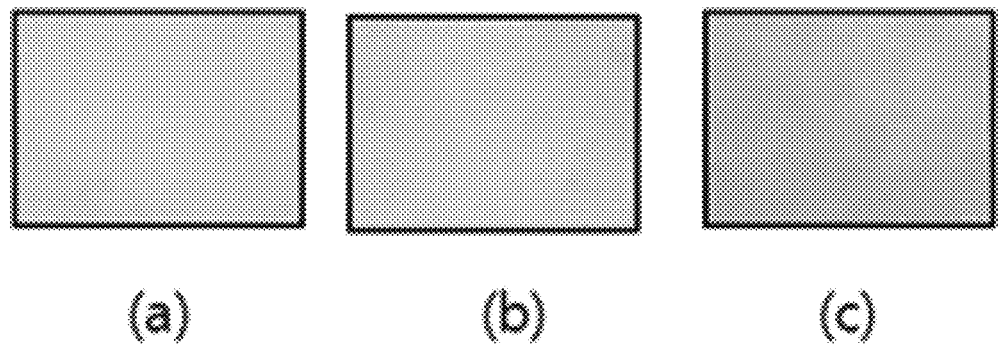
FIG. 7 shows the results of observing the color change under waterlogging conditions after preparation of divided color change layer matrices 21 and 22 and a pigment layer matrix 30, stacked on one another, for the identification polymer label 100 of the present invention.

FIG. 7 shows the results of observing the color change under waterlogging conditions, after preparing a sample of Experimental Example 1 from the label prepared to have the divided color change layer matrices 21 and 22 according to Example 2. It can be visually seen that (a) no color change was initially observed after 2 minutes, (b) it was not easy to distinguish due to very fine color change after 5 minutes, and (c) gradual distinct color change occurred after 10 minutes. (see Table 6 below).

In addition, it can be seen that, when the fluorescent pigment that is the feature of the present invention was observed visually by UV flash irradiation, particularly in a dark environment, (a) no color change was observed after 2 minutes, but (b) it was possible to observe color change, which is partially dot-shaped light emission but is clearly discriminated from that of the general pigment, after 5 minutes, and (c) very clear light emission was observed after 10 minutes.

As shown in FIGS. 6 and 7, the time difference between color development of the pigment layer matrix 30 prepared according to Example 2 and color change of the divided lower color change layer 22 results from adjustment of the moisture resistance, water absorption amount and water absorption rate of the lower color change layer matrix 22 and the color development rate of the pigment layer matrix 30. Due to the feature of the adjustment according to the present invention, very easy adjustment may be performed so that water absorption upon waterlogging, color development and coloring may sequentially occur.

Figure 8:
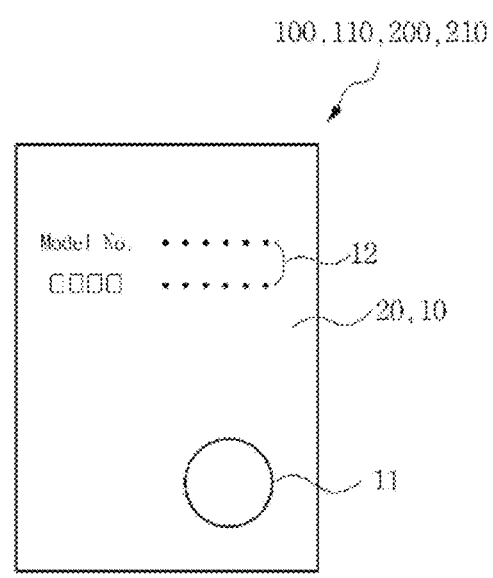
FIG. 8 is a front view of an identification polymer label 210 for inspection and maintenance of parts according to the present invention, the identification polymer label including a production information identification mark 12 and a window portion 11 that makes it possible to identify waterlogging.

FIG. 8 is a front view of an identification polymer label 210 prepared according to Example 3 of the present invention, which includes a window portion 11 that make it possible to identify waterlogging according to the engraving position, and a production information identification mark 12.

The identification polymer labels 100, 110, 200 and 210 for inspection and maintenance of parts according to the present invention, which are characterized by having long-tam stability against discoloration and durability, make it possible to accurately identify waterlogging even when the waterlogging identification window portion 11 is marked to have a very small size (e.g., a circular shape having a diameter of 2 mm) due to miniaturization of adherents. In addition, these polymer labels may also be easily marked with the production information identification mark 12 such as very fine letters.

Meanwhile, the identification marking may be implemented in various positions and shapes (e.g., circle, pattern, figure, letter, etc.). In addition, although the present invention described above is described with reference to the identification marking method based on laser light irradiation, which is a conventional means, users may implement identification marking by various conventional means.

Hereinafter, the present invention will be described in more detail with reference to Preparation Examples.

These Preparation Examples are provided to explain the present invention in more detail, and the scope of the present invention is not limited to these Preparation Examples.

Example 1

A composition for preparing a color change layer matrix of Preparation Example 1 (white) was applied onto a release film (a silicone-coated release film, 75 μm PET, Samil Co., Ltd.) using a comma coater (hot-air drying, Hantech Machinery Co.) and cured to form a single color change layer matrix 20 having a thickness of 30 μm (post-drying thickness; hereinafter mitted). Then, a composition for preparing a pigment layer matrix of Preparation Example 4 was applied onto the color change layer matrix 20 and cured to form pigment layer matrix 30 having a thickness of 10 μm, thereby completing the stacked color change layer matrix and pigment layer matrix 20 and 30.

A composition for an adhesive layer of Preparation Example 6 was applied onto a separate liner film 50 (a fluorine-coated release film, 50 μm PET, DongWon Film Co., Ltd.) and cured to form an adhesive layer 40 having a thickness of 30 μm. The pigment layer matrix 30 was laminated on the adhesive layer 40, thereby completing Example 1. Then, the release film used as a substrate was peeled off.

Example 2

A composition for preparing a color change layer matrix of Preparation Example 1 (white) was applied onto a release film (a silicone-coated release film, 75 μm PET, Samil Co., Ltd.) using a comma coater (hot-air drying, Hantech Machinery Co.) and cured to form a divided upper color change layer matrix 21 having a thickness of 20 μm. A composition for preparing a color change layer matrix of Preparation Example 2 (yellow) was applied onto the color change layer matrix 21 and cured to form a divided lower color change layer matrix 22 having a thickness of 30 μm. Then, a pigment layer matrix 30, an adhesive layer 40 and a release layer 50 were stacked and laminated on the lower color change layer matrix 22 in the same manner as in Example 1, thereby completing Example 2. Then, the release film used as a substrate was peeled off.

Example 3

A composition for preparing a color change layer matrix of Preparation Example 5 (black) was applied onto a release film (a silicone-coated release film, 75 μm PET, Samil Co., Ltd.) using a comma coater (hot-air drying, Hantech Machinery Co.) and cured to form an identification mark layer 10 having a thickness of 10 μm. A composition for preparing a color change layer matrix of Preparation Example (white) was applied onto the identification mark layer 10 and cured to form a divided upper color change layer matrix 21 having a thickness of 20 μm. Then, a divided lower color change layer matrix 22, a pigment layer matrix 30, an adhesive layer 40 and a release layer 50 were stacked and laminated on the upper color change layer matrix 21 in the same manner as in Example 2, thereby completing Example 3. Then, the release film used as a substrate was peeled off.

Preparation Examples 1 and 2> Compositions for Preparing Color Change Layer Matrices

TABLE 1

| Composition | Preparation Example 1 Content (wt %) | Preparation Example 2 Content (wt %) | Commercially available products |
| --- | --- | --- | --- |
| Coloring resin (transparent) | 40.0 | 40.0 | SCH1705PO (Orbital); resin solid content: 40% |
| Titanium dioxide | 5.5 | 5.5 | R-960 (Du Pont) |
| Yellow pigment | 0.0 | 1.0 | Sicotan Yellow K-1011 (BASF) |
| Material that change color by laser light | 0.16 | 0.0 | Lazerflair 8825 (Merck) |
| Silica | 0.3 | 0.3 | Aerosil 380 (Evonic) |
| Diatomaceous earth | 7.5 | 7.5 | Dongyang M&M Industry Co., Ltd. |
| Zeolite | 3.8 | 3.8 | Dongyang M&M Industry Co., Ltd. |
| Magnesium silicate hydrate | 0.6 | 0.6 | Dongyang M&M Industry Co., Ltd. |
| Dispersing agent | 1.8 | 1.8 | Efka PU 4061 (BASK) |
| Leveling agent | 1.0 | 1.0 | Efka FL 3670 (BASK) |
| Antifoaming agent | 0.3 | 0.3 | Efka PB 2010 (BASK) |
| Crosslinking agent | 3.2 | 3.2 | Tolonate LV2 (Vencorax) |
| Solvent | To 100 | To 100 | 7:3 mixed solvent of MEK and cyclohexanone |

<Preparation Examples 3 and 4> Compositions for Preparing Pigment Layer Matrices

TABLE 2

| Composition | Preparation Example 1 Content (wt %) | Preparation Example 2 Content (wt %) | Commercially available products |
|---|---|---|---|
| Coloring resin (transparent) | 40.0 | 40.0 | SCH1705PO (Orbital); resin solid content: 40% |
| Aqueous pigment | 1.0 | 0.0 | Sirius Blue GN/ Luminous Yellow FL (Dystar); 8/2 |
| Adsorbed crosslinked aqueous pigment | 0.0 | 2.4 | TexF blue 65/FUV-03 White (Smartcolor); 7/3 |
| Zeolite | 2.8 | 3.0 | Dongyang M&M Industry Co., Ltd. |
| Material that change color by laser light | 0.1 | 0.1 | Lazerflair 8825 (Merck) |
| Silica | 0.2 | 0.3 | Aerosil 380 (Evonic) |
| Diatomaceous earth | 2.0 | 2.2 | Dongyang M&M Industry Co., Ltd. |
| Clay | 0.6 | 0.0 | Dongyang M&M Industry Co., Ltd. |
| Flame retardant | 2.5 | 2.5 | EPFR-400B (Young's Corp.) |
| Silane | 0.15 | 0.05 | XIAMETER ® OFS-6040 (Dow Corning) |
| Dispersing agent | 0.7 | 0.8 | Efka PU 4061 (BASK) |
| Leveling agent | 1.0 | 1.0 | Efka FL 3670 (BASK) |
| Antifoaming agent | 0.3 | 0.3 | Efka PB 2010 (BASK) |
| Crosslinking agent | 2.4 | 1.8 | Tolonate LV2 (Vencorax) |
| Solvent | To 100 | To 100 | 7:3 mixed solvent of MEK and cyclohexanone |

<Preparation Example 5> Composition for Preparing Identification Mark Layer

TABLE 3

| Composition | Content (wt %) | Commercially available products |
|---|---|---|
| CTC100-S (transparent) | 40.0 | SCH1705PO (Orbital); resin solid content: 40% |
| Titanium black | 1.2 | Tilack D (Ako Kasei) |
| Magnesium silicate hydrate | 1.4 | Dongyang M&M Industry Co., Ltd. |
| Calcium carbonate | 1.5 | Dongyang M&M Industry Co., Ltd. |
| Flame retardant | 2.5 | EPFR-400B (Young's Corp.) |
| Alumina | 2.8 | Dongyang M&M Industry Co., Ltd. |
| Material that change color by laser light | 0.1 | Lazerflair 8825 (Merck) |
| Dispersing agent | 2.5 | Efka PU 4061 (BASK) |
| Leveling agent | 1.0 | Efka FL 3670 (BASK) |
| Antifoaming agent | 0.3 | Efka PB 2010 (BASK) |
| Crosslinking agent | 12 | Tolonate LV2 (Vencorax) |
| Solvent | To 100 | 7:3 mixed solvent of MEK and cyclohexanone |

<Preparation Example 6> Composition for Preparing Adhesive Layer

TABLE 4

| Composition | Commercially available Content (wt %) | products |
|---|---|---|
| Silicone adhesive | 66.0 | KR-3700 (ShinEtsu) |
| Catalyst | 0.33 | CAT-PL-50T (ShinEtsu) |
| Solvent | 33.67 | Toluene |

Experimental Example 1

The identification polymer label for inspection and maintenance of parts, prepared in Example 2 above, was die-cut to a size of 10 mm (W)×10 mm (L). To foam a circular waterlogging identification window portion having a diameter of 5 mm, the center of the cut label was engraved up to the boundary line between the divided color change layer matrices 21 and 22 using a laser (laser source power: 20 W, power: 70%, frequency: 20 kHz, speed: 900 mm/s, waveform: 242 ns, model: 20 W fiber laser marking machine, Markray Co., Korea), thus exposing the surface of the color change layer matrix. Then, a color change test was performed under the following conditions.

The label of Example 2 was placed in a temperature/ humidity tester (model: YTH-150, Yuanyao) under the following conditions, and after the indicated time, the label was visually observed by ultraviolet light (model: UV flash; M-Vision, Co., Ltd.).

TABLE 5

| Test conditions | | Results |
|---|---|---|
| 60% RH and 23° C. temperature | After 10 days | No change |
| 90% RH and 75° C. temperature | After 10 days | No change |

The label of Example 2 was immersed in water, and observed visually at different time points after immersion.

TABLE 6

| Test conditions | Results |
|---|---|
| Visual observation after 2 minutes of water immersion | No change |
| Visual observation after 5 minutes of water immersion | Very fine color change difficult to distinguish |
| Visual observation after 10 minutes of water immersion | Definite color change |

Whether the waterlogged label can be recognized visually was examined through ultraviolet light (model: UV flash, M-Vision Co., Ltd.) in a light or dark environment.

TABLE 7

| Test conditions | Results |
|---|---|
| Label after 2 minutes of waterlogging | Emitted no light |
| Label after 5 minutes of waterlogging | Partially emitted light in fine dot shape, and color change could be distinguished. |

TABLE 7-continued

| Test conditions | Results |
| --- | --- |
| Label after 10 minutes of waterlogging | Entirely emitted clear light, and color change was clearly distinguished. |

From the results in Table 5 above, it could be confirmed that the identification polymer label for inspection and maintenance of parts according to the present invention was not discolored in the surrounding high-temperature and high-humidity environment, suggesting that the polymer label is stable against discoloration. From the results in Tables 6 and 7 above, it could be confirmed that discoloration proceeded after 5 minutes of waterlogging, suggesting that the polymer label can be prevented from being discolored rapidly by the surrounding water droplets or the like.

The identification of waterlogging becomes possible because the water resistance, water absorption amount, water absorption rate of the color change layer matrix and the color development rate of the pigment layer matrix are adjusted, and thus water that permeates the color change layer matrix upon waterlogging reaches the pigment layer matrix, so that the adsorbed crosslinked pigment in the pigment layer matrix develops color and colors the pigment layer matrix, and then the saturated pigment is provided to and colors the color change layer matrix thereon.

The composition for each layer of the present invention as described above is composed of a solution and fine particles of the resin, the pigment, the aqueous pigment, the filler, the solvent, and the like. There is no limitation on the type of solvent that may be used, and examples of the solvent include ketones, ethers, glycol ethers, esters, alcohols, water, and the like. Alternatively, the compositions may be prepared and used as solvent-free compositions.

In addition, to improve the stability, coatability and functionality of the compositions, conventional additives may be added. For example, each composition may further contain a plasticizer, wax, an adhesion promoter, a surfactant, a surface modifier, a mordant, a pH adjusting agent, a resin stabilizer, a color preservative, an antibacterial agent, a water repellent, a coupling agent, an antioxidant, a viscosity modifier, a matting agent, a flame retardant, a dispersant, a leveling agent, an antifoaming agent, and the like.

The compositions may be coated using various coating methods, such as curtain coating, knife coating, roll coating, comma coating, or the like, and methods other the above-described coating methods may also be used without limitation.

Although the present invention has been described in detail only with respect to the described embodiments, it is obvious to those skilled in the art that various changes and modifications are possible without departing from the scope of the technical idea of the present invention, and such changes and modifications fall within the appended claims.

The invention claimed is:

1. An identification polymer label for inspection and maintenance of parts, the identification polymer label comprising:
    a color change layer matrix containing a coloring resin in which a hydrophilic polymer and a hydrophobic polymer are crosslinked with each other at a weight ratio of 6:4 to 2:8; and
    a pigment layer matrix formed under the color change layer matrix and containing an aqueous pigment and a color-developing resin in which a hydrophilic polymer and a hydrophobic polymer are crosslinked with each other at a weight ratio of 8:2 to 3:7.

2. The identification polymer label of claim 1, wherein the color change layer matrix is composed of either a single color change layer matrix having a single color, or divided color change layer matrices and having different colors.

3. The identification polymer label of claim 1, wherein the hydrophilic polymer in the color change layer matrix and the pigment layer matrix is a polyoxide-based copolymer comprising one or more selected from the group consisting of polyethylene oxide (A), polypropylene oxide (B) and polybutylene oxide (C).

4. The identification polymer label of claim 1, wherein the hydrophobic polymer in the color change layer matrix and the pigment layer matrix comprises one or more selected from the group consisting of polyolefin resin, polyester resin, polyurethane resin, polyamide resin, vinyl resin, fluorine resin, silicone resin, urea resin, phenol resin, epoxy resin, and acrylic resin.

5. The identification polymer label of claim 1, wherein the color change layer matrix and the pigment layer matrix further contain one or more adsorbent fillers selected from the group consisting of clay, diatomaceous earth, silica, magnesite, and zeolite.

6. The identification polymer label of claim 1, wherein the color change layer matrix and the pigment layer matrix further contain water-dispersible polymer fine particles of one or more selected from the group consisting of polyester resin, acrylic resin, polyurethane resin, and vinyl resin.

7. The identification polymer label of claim 1, wherein the color change layer matrix and the pigment layer matrix further contain a coloring and color development enhancer, in which the coloring and color development enhancer is one or more selected from the group consisting of hydrophilic rubber-based resins, cellulose-based resins, dextrin, oxidized starch, starch/vinyl acetate graft copolymers, polyvinyl alcohol, polyvinyl pyrrolidone, polyvinyl pyrrolidone/vinyl acetate copolymers, polyethyleneimine resin, polyethylene glycol resin, poly(meth)acrylamide resin, poly(meth)acrylic acid resin, polyamide epoxy resin, poly(meth)acrylic ether resin, polyhydroxy(meth)acrylic resin, polyvinyl acetate resin, polyvinyl acid resin, polyvinylamine resin, and polyoxide resin.

8. The identification polymer label of claim 1, wherein the aqueous pigment in the pigment layer matrix is one selected from an aqueous general pigment or an aqueous fluorescent pigment, or is a pigment in which one or more of the aqueous general pigment or the aqueous fluorescent pigment are adsorbed and crosslinked.

9. An identification polymer label for inspection and maintenance of parts, the identification polymer label comprising:
    an identification mark layer;
    a color change layer matrix formed under the identification mark layer and containing a coloring resin in which a hydrophilic polymer and a hydrophobic polymer are crosslinked with each other at a weight ratio of 6:4 to 2:8; and
    a pigment layer matrix formed under the color change layer matrix and containing an aqueous pigment and a color-developing resin in which a hydrophilic polymer and a hydrophobic polymer are crosslinked with each other at a weight ratio of 8:2 to 3:7.

10. The identification polymer label of claim 1, wherein an adhesive layer under the pigment layer matrix and a release layer under the adhesive layer are further formed.

11. The identification polymer label of claim 1, wherein at least any one of the color change layer matrix or the pigment layer matrix further contains a material that changes color by irradiation with laser light.

12. The identification polymer label of claim 11, wherein the material that changes color is one or more metal powders selected from among copper, aluminum, nickel, iron, or titanium, or is one or more metal oxides selected from among titanium black ($Ti_4O_7$), aluminum oxide, cuprous oxide, iron oxide, or magnesium oxide.

13. A method for identification marking of a polymer label, the method comprising exposing a surface of a color change layer matrix in the identification polymer label of claim 1 by performing one or more selected from surface discoloration by laser light irradiation and engraving depth adjustment, thus making the identification marking possible.

14. The identification polymer label of claim 9, wherein the identification mark layer contains magnesium silicate hydrate in epoxy-based resin or acryl-based resin.

15. The identification polymer label of claim 9, wherein at least any one of the color change layer matrix, the pigment layer matrix or the identification mark layer further contains a material that changes color by irradiation with laser light.

16. The identification polymer label of claim 15, wherein the material that changes color is one or more metal powders selected from among copper, aluminum, nickel, iron, or titanium, or is one or more metal oxides selected from among titanium black ($Ti_4O_7$), aluminum oxide, cuprous oxide, iron oxide, or magnesium oxide.

17. The identification polymer label of claim 9, wherein the color change layer matrix is composed of either a single color change layer matrix having a single color, or divided color change layer matrices and having different colors.

18. The identification polymer label of claim 9, wherein the hydrophilic polymer in the color change layer matrix and the pigment layer matrix is a polyoxide-based copolymer comprising one or more selected from the group consisting of polyethylene oxide (A), polypropylene oxide (B) and polybutylene oxide (C).

19. The identification polymer label of claim 9, wherein the hydrophobic polymer in the color change layer matrix and the pigment layer matrix comprises one or more selected from the group consisting of polyolefin resin, polyester resin, polyurethane resin, polyamide resin, vinyl resin, fluorine resin, silicone resin, urea resin, phenol resin, epoxy resin, and acrylic resin.

20. The identification polymer label of claim 9, wherein the color change layer matrix and the pigment layer matrix further contain one or more adsorbent fillers selected from the group consisting of clay, diatomaceous earth, silica, magnesite, and zeolite.

21. The identification polymer label of claim 9, wherein the color change layer matrix and the pigment layer matrix further contain water-dispersible polymer fine particles of one or more selected from the group consisting of polyester resin, acrylic resin, polyurethane resin, and vinyl resin.

22. The identification polymer label of claim 9, wherein the color change layer matrix and the pigment layer matrix further contain a coloring and color development enhancer, in which the coloring and color development enhancer is one or more selected from the group consisting of hydrophilic rubber-based resins, cellulose-based resins, dextrin, oxidized starch, starch/vinyl acetate graft copolymers, polyvinyl alcohol, polyvinyl pyrrolidone, polyvinyl pyrrolidone/vinyl acetate copolymers, polyethyleneimine resin, polyethylene glycol resin, poly(meth)acrylamide resin, poly(meth)acrylic acid resin, polyamide epoxy resin, poly(meth)acrylic ether resin, polyhydroxy(meth)acrylic resin, polyvinyl acetate resin, polyvinyl acid resin, polyvinylamine resin, and polyoxide resin.

23. The identification polymer label of claim 9, wherein the aqueous pigment in the pigment layer matrix is one selected from an aqueous general pigment or an aqueous fluorescent pigment, or is a pigment in which one or more of the aqueous general pigment or the aqueous fluorescent pigment are adsorbed and crosslinked.

24. The identification polymer label of claim 9, wherein an adhesive layer under the pigment layer matrix and a release layer under the adhesive layer are further formed.

25. A method for identification marking of a polymer label, the method comprising exposing a surface of a color change layer matrix in the identification polymer label of claim 9 by performing one or more selected from surface discoloration by laser light irradiation and engraving depth adjustment, thus making the identification marking possible.

\* \* \* \* \*